United States Patent
Rhee et al.

(10) Patent No.: US 9,791,561 B2
(45) Date of Patent: Oct. 17, 2017

(54) RECEIVER, METHOD OF OPERATING THE RECEIVER, AND BEAMFORMING RADAR SYSTEM INCLUDING RECEIVER

(71) Applicants: Samsung Electronics Co., Ltd., Suwon-si (KR); Tsinghua University, Beijing (CN)

(72) Inventors: Woogeun Rhee, Beijing (CN); Xican Chen, Beijing (CN); Jong Jin Kim, Hwaseong-si (KR); Dong Wook Kim, Seoul (KR); Zhihua Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

(21) Appl. No.: 14/339,669

(22) Filed: Jul. 24, 2014

(65) Prior Publication Data

US 2015/0177364 A1    Jun. 25, 2015

(30) Foreign Application Priority Data

Dec. 20, 2013 (KR) .................. 10-2013-0160652

(51) Int. Cl.
| | |
|---|---|
| *G01S 13/02* | (2006.01) |
| *G01S 13/52* | (2006.01) |
| *G01S 13/42* | (2006.01) |
| *G01S 13/88* | (2006.01) |
| *G01S 15/52* | (2006.01) |
| *H04R 25/00* | (2006.01) |

(52) U.S. Cl.
CPC .............. *G01S 13/52* (2013.01); *G01S 13/42* (2013.01); *G01S 13/88* (2013.01); *G01S 15/52* (2013.01); *G01S 2013/0263* (2013.01); *H04R 25/554* (2013.01)

(58) Field of Classification Search
CPC .......... G01S 13/42; G01S 13/52; G01S 13/88; G01S 15/52; G01S 2013/0263; H04R 25/554
USPC ................................... 342/176, 195
See application file for complete search history.

(56) References Cited

U.S. PATENT DOCUMENTS

| | | | |
|---|---|---|---|
| 5,462,058 A * | 10/1995 | Yamada | G01S 7/52042 600/454 |
| 7,015,856 B1 * | 3/2006 | Johnson | G01S 13/782 342/29 |
| 7,504,976 B1 * | 3/2009 | Pellon | H04L 27/36 341/143 |
| 2002/0007119 A1 * | 1/2002 | Pelissier | A61B 8/06 600/443 |
| 2003/0085832 A1 | 5/2003 | Yu | |

(Continued)

*Primary Examiner* — Timothy A Brainard
(74) *Attorney, Agent, or Firm* — NSIP Law (57) ABSTRACT

A receiver, an operating method of the receiver, and a beamforming radar system including the receiver are provided. A beamforming receiver may include a demodulation circuit configured to receive a signal reflected from an object via an antenna, to demodulate the received signal, and to generate a demodulated signal, and a time delay circuit configured to generate a digital signal by processing the demodulated signal based on reference clock signals, wherein the digital signal including static delay information associated with a static motion of the object, and dynamic delay information associated with a dynamic motion of the object.

19 Claims, 5 Drawing Sheets

(56) References Cited

U.S. PATENT DOCUMENTS

| | | | |
|---|---|---|---|
| 2008/0119716 A1* | 5/2008 | Boric-Lubecke | A61B 5/0205 600/407 |
| 2011/0148707 A1* | 6/2011 | Thiesen | H01Q 3/2605 342/372 |
| 2012/0191155 A1* | 7/2012 | Hatlestad | A61B 5/103 607/17 |

* cited by examiner

RECEIVER, METHOD OF OPERATING THE RECEIVER, AND BEAMFORMING RADAR SYSTEM INCLUDING RECEIVER

CROSS-REFERENCE TO RELATED APPLICATION(S)

This application claims the benefit under 35 USC 119(a) of Korean Patent Application No. 10-2013-0160652, filed on Dec. 20, 2013, in the Korean Intellectual Property Office, the entire disclosure of which is incorporated herein by reference for all purposes.

BACKGROUND

1. Field

The following description relates to a receiver, a method of operating the receiver, and a beamforming radar system including the receiver.

2. Description of Related Art

Beamforming radar structures require time delay circuits for beamforming. In beamforming radar structures, an analog beamformer scheme, and a digital beamformer scheme may be used.

In the analog beamformer scheme, an analog beamformer may add signals received through a plurality of transmission paths. To ensure a signal-to-noise ratio (SNR), the analog beamformer may need to adjust a delay so that the received signals may have the same phase.

The digital beamformer scheme may refer to beamforming in a digital domain using an analog-to-digital converter (ADC). However, the digital beamformer scheme also needs to compensate for a delay between signals received through a plurality of transmission paths in the digital domain, and to add the signals.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a beamforming receiver including a demodulation circuit configured to receive a signal reflected from an object via an antenna, to demodulate the received signal, and to generate a demodulated signal, and a time delay circuit configured to generate a digital signal by processing the demodulated signal based on reference clock signals, wherein the digital signal comprises static delay information associated with a static motion of the object and dynamic delay information associated with a dynamic motion of the object.

The static delay information may comprise a direct current (DC) offset, and the dynamic delay information comprises an alternating current (AC) component.

The receiver may include a filtering circuit configured to filter the static delay information in the digital signal.

The receiver may include an adder configured to add a plurality of digital signals.

The adder may be connected to a rear side of the filtering circuit.

The adder may be disposed between the time delay circuit and the filtering circuit.

The filtering circuit may be implemented as at least one of a high-pass filter (HPF) or a band-pass filter (BPF).

The demodulation circuit may include a low-noise amplifier (LNA) configured to amplify the reflected signal to generate an amplified signal, and a demodulator configured to demodulate the amplified signal to generate the demodulated signal.

The receiver may include a phase detection circuit configured to detect a change in a phase of the demodulated signal based on a detection window defined by the reference clock signals.

In response to the change being detected within the detection window, the time delay circuit may be further configured to generate the digital signal by processing the demodulated signal based on the reference clock signals.

The time delay circuit may comprise a 1-bit delta-sigma time delay circuit.

The adder may be further configured to generate a sum signal based on adding the static delay information and the dynamic delay information of the plurality of digital signals, and to provide the added sum signal to the filtering circuit.

The LNA may be further configured to remove noise from the reflected signal.

In another general aspect, there is provided a method of operating a beamforming receiver, the method including receiving a signal reflected from an object via an antenna, demodulating the received signal to generate a demodulated signal, and generating a digital signal by processing the demodulated signal based on reference clock signals, wherein the digital signal comprises static delay information associated with a static motion of the object and dynamic delay information associated with a dynamic motion of the object.

The digital signal may be generated using a time-to-digital conversion (TDC) scheme.

The static delay information may include a direct current (DC) offset, and the dynamic delay information comprises an alternating current (AC) component.

The method of operating may include adding a plurality of the digital signals.

The method of operating may include filtering the static delay information in the digital signal.

The demodulating may include amplifying the reflected signal to generate an amplified signal, and demodulating the amplified signal to generate the demodulated signal.

The generating may include detecting a change in a phase of the demodulated signal based on a detection window defined by the reference clock signals, and generating the digital signals by processing the demodulated signal based on the reference clock signals in response to the change being detected within the detection window.

In another general aspect, there is provided a beamforming radar including a receiver comprising a demodulation circuit configured to receive a signal reflected from an object via an antenna, to demodulate the received signal, and to generate a demodulated signal, and a time delay circuit configured to generate a digital signal by processing the demodulated signal based on reference clock signals, a signal processor configured to process the digital signal to generate processed digital signal, and a display module configured to analyze the processed digital signal and to generate image data corresponding to the signal reflected from the object.

The time delay circuit may include a selecting circuit configured to select one of the reference clock signals as the feedback clock signal, a phase frequency detector configured to detect a difference between a phase of the demodulated signal and a phase of the feedback clock signal, and to generate a phase detection signal corresponding to the detected difference, a charge pump configured to source a current output from a power source to an output terminal or to sink the current from the output terminal to the ground in response to the phase detection signal, a loop filter configured to generate a variable output voltage based on the sourcing or sinking of the current, and a comparator configured to compare the output voltage to a reference voltage and to generate the digital signal based on the comparison.

The selecting circuit may be implemented as a multiplexer (MUX).

The loop filter may be further configured to prevent a voltage overshoot or to remove a jitter.

The digital signal may include static delay information associated with a static motion of the object and dynamic delay information associated with a dynamic motion of the object.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
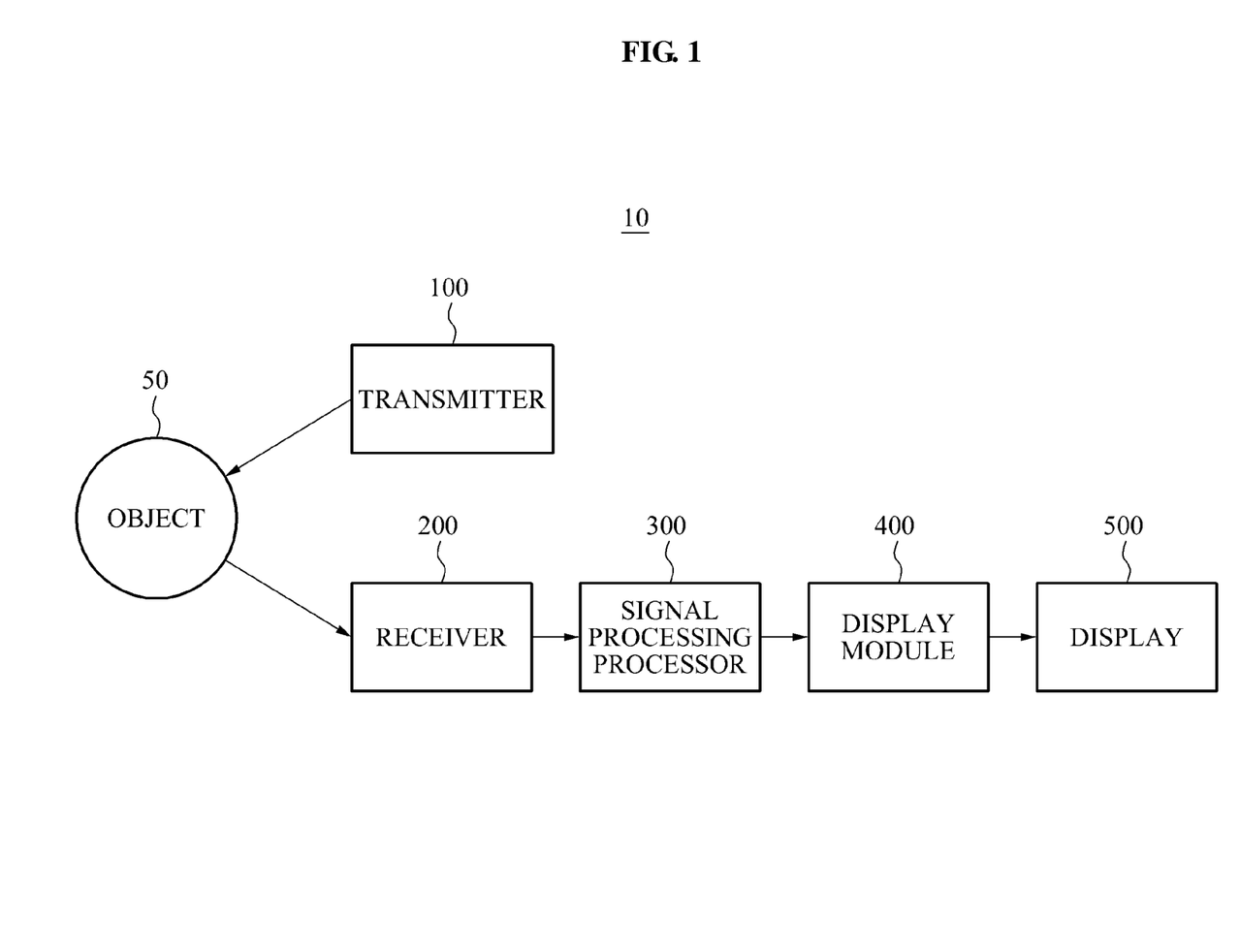
FIG. 1 is a diagram illustrating an example of a beamforming radar system.

FIG. 1 is a diagram illustrating an example of a beamforming radar system 10. The beamforming radar system 10 of FIG. 1 includes a transmitter 100, a receiver 200, a signal processing processor 300, a display module 400, and a display 500.

The transmitter 100 may generate a plurality of signals, and may output the plurality of signals to an object 50. The plurality of signals may include signals, such as, for example, radio frequency (RF) signals, impulse signals, or ultra-wideband (UWB) signals.

The receiver 200 may receive signals reflected from the object 50, may demodulate the received signals, and may generate demodulated signals. The receiver 200 may generate digital signals by processing the demodulated signals based on reference clock signals, using a time-to-digital conversion (TDC) scheme. The digital signals may include static delay information associated with a static motion of the object 50, and dynamic delay information associated with a dynamic motion of the object 50. The static delay information may be, for example, information associated with a static delay of a reflected signal caused by the static motion of the object 50. The dynamic delay information may be, for example, information associated with a dynamic delay of a reflected signal caused by the dynamic motion of the object 50.

In a non-exhaustive example, the receiver 200 may be implemented in an auditory apparatus using beamforming. The auditory apparatus may include all devices that are detachably fixed to or in close contact with an ear of a user to provide the user with audio signals based on a sound generated outside the ear. The auditory apparatus may include, for example, a hearing aid configured to amplify the audio signal, and to aid the user in perceiving the amplified audio signal. The auditory apparatus may include or be included in a system supporting a hearing aid function. Such a system may include, but is not limited to, a mobile device, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a television (TV), a high definition television (HDTV), an optical disc player, a DVD player, a Blue-ray player, a setup box, any other, consumer electronics/information technology (CE/IT) device, a plug-in accessory or a hearing aid module having a sound or broadcasting relay function for a hearing aid, and a hearing aid chip. Furthermore, the auditory apparatus may include, for example, a monaural apparatus configured to generate an audio signal in a single ear, and a binaural apparatus configured to generate an audio signal in both ears.

The static motion of the object 50 may indicate that the object 50 has almost no motion in a predetermined position. The static delay information may include information on a delay of a reflected signal caused by the object 50 that almost does not move in the predetermined position. The static delay information may include delay information associated with a delay of a reflected signal caused by the object 50 in a static position. For example, when the object 50 is a heart, the static delay information may be delay information associated with a delay of a reflected signal due to the heart located in a static position of a user.

The dynamic motion of the object 50 may indicate that the object 50 moves in a predetermined position. The dynamic delay information may include information on a delay of a reflected signal caused by the object 50 that dynamically moves in the predetermined position. For example, when the object 50 is a heart, the dynamic delay information may be delay information associated with a delay of a reflected signal due to a heartbeat of the heart.

The signal processing processor 300 may process the digital signals generated by the receiver 200. For example, the signal processing processor 300 may calculate a distance between the beamforming radar system 10 and the object 50 based on the digital signals. Additionally, the signal processing processor 300 may calculate a depth of the object 50 based on the digital signals. Furthermore, the signal processing processor 300 may calculate a delay time between a signal transmitted by the transmitter 100 and a signal received by the receiver 200 based on the digital signals. The signal processing processor 300 may transmit the processed digital signals to the display module 400.

The display module 400 may process signals output from the signal processing processor 300, and may generate image data corresponding to signals reflected from the object 50. The display module 400 may transmit the image data to the display 500.

The display 500 may receive the image data from the display module 400, and may display the image data.

The display 500 may be implemented, for example, as a touch screen, a liquid crystal display (LCD), a thin film transistor (TFT)-LCD, a light emitting diode (LED) display, an organic LED (OLED) display, an active matrix OLED (AMOLED) display, a plasma display panel (PDP), a flexible display, a screen, or a terminal. A screen may be a physical structure that includes one or more hardware components that provide the ability to render a user interface and/or receive user input. The screen can encompass any combination of display region, gesture capture region, a touch sensitive display, and/or a configurable area. The screen can be embedded in the hardware or may be an external peripheral device that may be attached and detached from the apparatus. The display may be a single-screen or a multi-screen display. A single physical screen can include multiple displays that are managed as separate logical displays permitting different content to be displayed on separate displays although part of the same physical screen. The display may also be implemented as an eye glass display (EGD), which includes one-eyed glass or two-eyed glasses.

Figure 2:
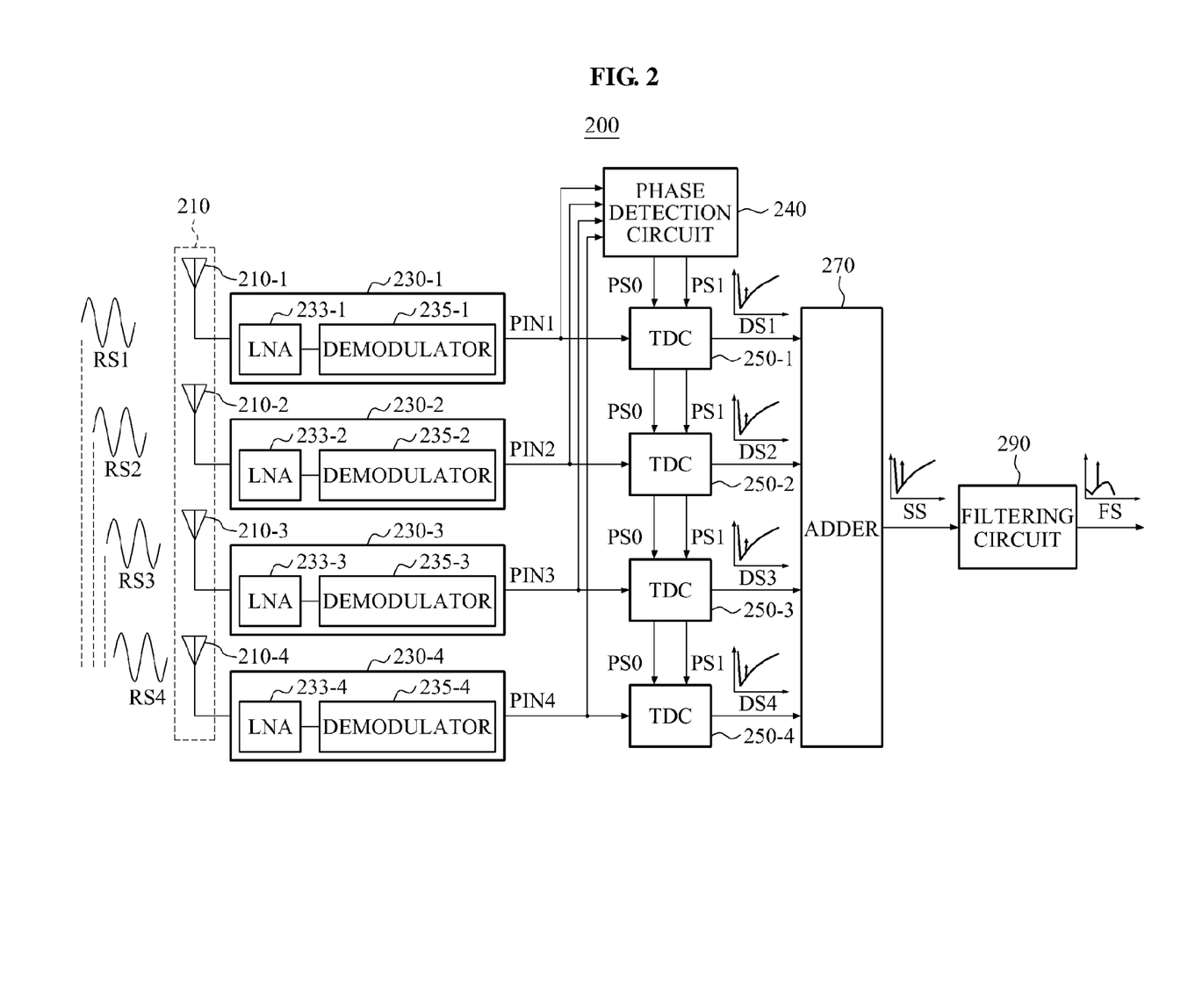
FIG. 2 is a diagram illustrating an example of a receiver of FIG. 1.

FIG. 2 is a diagram illustrating an example of the receiver 200 of FIG. 1. Referring to FIGS. 1 and 2, the receiver 200 includes an antenna array 210, demodulation circuits 230-1 to 230-4, a phase detection circuit 240, time-to-digital converters (TDCs) 250-1 to 250-4, an adder 270, and a filtering circuit 290. In FIG. 2, for convenience of description, four antennas, four demodulation circuits, four TDCs, one adder, one filtering circuit and one phase detection circuit are provided. However, the scope of the present disclosure may not be limited by the number of antennas, demodulation circuits, TDCs, adder, filtering circuit, and/or phase detection circuit.

The antenna array 210 may include a plurality of antennas, for example, antennas 210-1 to 210-4. The antennas 210-1 to 210-4 may receive signals RS1 to RS4 reflected from the object 50. Each of the reflected signals RS1 to RS4 may be, for example, a signal transmitted by the transmitter 100, reflected from the object 50, and delayed. The reflected signals RS1 to RS4 may have different phases. The antennas 210-1 to 210-4 may transmit the reflected signals RS1 to RS4 to the demodulation circuits 230-1 to 230-4, respectively.

The demodulation circuits 230-1 to 230-4 may demodulate the reflected signals RS1 to RS4, and may generate demodulated signals PIN1 to PIN4, respectively. Referring to FIG. 2, the demodulation circuits 230-1 to 230-4 include low-noise amplifiers (LNAs) 233-1 to 233-4, and demodulators 235-1 to 235-4, respectively.

For example, the demodulation circuit 230-1 may receive the reflected signal RS1 via the antenna 210-1, may demodulate the reflected signal RS1, and may generate the demodulated signal PIN1. In this example, the LNA 233-1 may amplify the reflected signal RS1, and may generate an amplified signal. Additionally, the LNA 233-1 may remove noise from the reflected signal RS1. The demodulator 235-1 may demodulate the amplified signal, and may generate the demodulated signal PIN1.

The demodulation circuit 230-2 may receive the reflected signal RS2 via the antenna 210-2, may demodulate the reflected signal RS2, and may generate the demodulated signal PIN1. For example, the LNA 233-2 may amplify the reflected signal RS2, and may generate an amplified signal. Additionally, the LNA 233-2 may remove noise from the reflected signal RS2. The demodulator 235-2 may demodulate the amplified signal, and may generate the demodulated signal PIN2.

The demodulation circuit 230-3 may receive the reflected signal RS3 via the antenna 210-3, may demodulate the reflected signal RS3, and may generate the demodulated signal PIN3. For example, the LNA 233-3 may amplify the reflected signal RS3, and may generate an amplified signal. Additionally, the LNA 233-3 may remove noise from the reflected signal RS3. The demodulator 235-3 may demodulate the amplified signal, and may generate the demodulated signal PIN3.

The demodulation circuit 230-4 may receive the reflected signal RS4 via the antenna 210-4, may demodulate the reflected signal RS4, and may generate the demodulated signal PIN4. For example, the LNA 233-4 may amplify the reflected signal RS4, and may generate an amplified signal. Additionally, the LNA 233-4 may remove noise from the reflected signal RS4. The demodulator 235-4 may demodulate the amplified signal, and may generate the demodulated signal PIN4.

Noise in the reflected signal RS1, RS2, RS3, or RS4 may be generated due to multi-path fading, and the like.

The demodulation circuits 230-1 to 230-4 may transmit the demodulated signals PIN1 to PIN4 to the phase detection circuit 240 and the respective TDCs, TDCs 250-1 to 250-4.

The phase detection circuit 240 may generate reference clock signals PS0 and PS1 based on signals generated by a signal generator (not illustrated) included in the transmitter 100. For example, a plurality of clock signals with different phases may be generated by the signal generator, and may be referred to as "multi-phase clock signals." The reference clock signals PS0 and PS1 may have different phases and the same frequency.

The phase detection circuit 240 may detect a change in a phase of each of the demodulated signals PIN1 to PIN4 based on a detection window. The detection window may be defined by the reference clock signals PS0 and PS1. The phase detection circuit 240 may output the reference clock signals PS0 and PS1 to the TDCs 250-1 to 250-4. A phase change detection operation performed by the phase detection circuit 240 will be further described with reference to FIG. 4.

The TDCs 250-1 to 250-4 may generate digital signals DS1 to DS4 by processing the demodulated signals PIN1 to PIN4 based on the reference clock signals PS0 and PS1. Each of the digital signals DS1 to DS4 may include static delay information associated with the static motion of the object 50, and dynamic delay information associated with the dynamic motion of the object 50. The static delay information in each of the digital signals DS1 to DS4 may be, for example, information associated with an identical static motion or different static motion of the object 50. The dynamic delay information in each of the digital signals DS1 to DS4 may be, for example, information associated with an identical dynamic motion or different dynamic motion of the object 50.

Each of the TDCs 250-1 to 250-4 may refer to a time delay circuit. In an example, each of the TDCs 250-1 to 250-4 may be implemented, for example, as a 1-bit delta-sigma TDC.

The TDC 250-1 may generate the digital signal DS1 by processing the demodulated signal PIN1 based on the reference clock signals PS0 and PS1. The TDC 250-2 may generate the digital signal DS2 by processing the demodulated signal PIN2 based on the reference clock signals PS0 and PS1. The TDC 250-3 may generate the digital signal DS3 by processing the demodulated signal PIN3 based on the reference clock signals PS0 and PS1. The TDC 250-4 may generate the digital signal DS4 by processing the demodulated signal PIN4 based on the reference clock signals PS0 and PS1.

The digital signals DS1 to DS4 of FIG. 2 may be represented in a frequency domain. In the digital signals DS1 to DS4, the static delay information may be, for example, a direct current (DC) offset, and the dynamic delay information may be, for example, an alternating current (AC) component.

The adder 270 may add the digital signals DS1 to DS4. For example, the adder 270 may add the static delay information and dynamic delay information included in each of the digital signals DS1 to DS4. The adder 270 may output a sum signal SS to the filtering circuit 290.

The filtering circuit 290 may perform filtering on the sum signal SS output from the adder 270. For example, the filtering circuit 290 may perform filtering on the static delay information included in the sum signal SS. The filtering circuit 290 may perform filter the static delay information, for example a DC offset, in each of the digital signals DS1 to DS4. The filtering circuit 290 may filter the noise in the sum signal SS. In an example, the filtering circuit 290 may be implemented as a high-pass filter (HPF). In another example, the filtering circuit 290 may be implemented as a band-pass filter (BPF).

The filtering circuit 290 may transmit a filtered signal FS to the signal processing processor 300.

As illustrated in FIG. 2, the adder 270 is connected between the TDCs 250-1 to 250-4 and the filtering circuit 290. Other arrangements for connecting the adder are considered to be well within the scope of the present disclosure. For example, the adder 270 may be connected to a rear side of the filtering circuit 290.

Through the TDC scheme, a static delay associated with the static motion of the object 50 may be converted to a DC offset, and a dynamic delay associated with the dynamic motion of the object 50 may be converted to an AC component. Accordingly, the receiver 200 may use a significant AC component by removing the DC offset through filtering circuit 290, without a need to equalize phases of the reflected signals RS1 to RS4. Additionally, the receiver 200 may improve a signal-to-noise ratio (SNR) without a delay cell.

Figure 3:
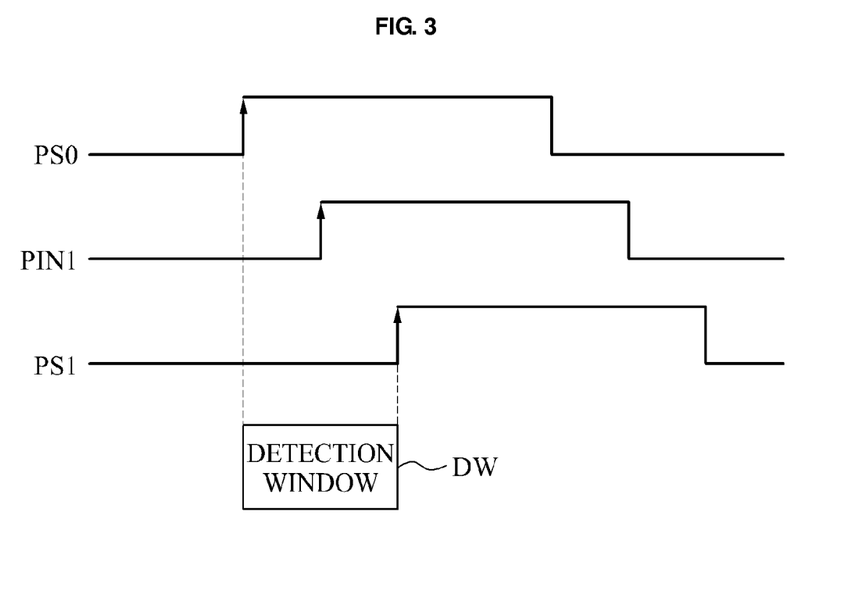
FIG. 3 is a diagram illustrating an example of an operation of a phase detection circuit of FIG. 2.

FIG. 3 is a diagram illustrating an example of an operation of the phase detection circuit 240 of FIG. 2. In FIG. 3, for convenience of description, an operation of detecting a change in a phase based on the demodulated signal PIN1 is described.

Referring to FIGS. 1 through 3, the phase detection circuit 240 may generate the reference clock signals PS0 and PS1 based on a plurality of multi-phase signals.

The phase detection circuit 240 may coarsely tune the demodulated signal PIN1 based on the reference clock signals PS0 and PS1.

The phase detection circuit 240 may detect a change in the phase of the demodulated signal PIN1 based on a detection window DW, which is defined by the reference clock signals PS0 and PS1, and may output the reference clock signals PS0 and PS1 to the TDC 250-1.

As illustrated in FIG. 3, the detection window DW may be defined by a positive edge of an early reference clock signal, for example the reference clock signal PS0, and a positive edge of a late reference clock signal, for example the reference clock signal PS1. Additionally, the detection window DW may be defined by a falling edge of the early reference clock signal, and a falling edge of the late reference clock signal.

In an example in which the change in the phase of the demodulated signal PIN1 is detected within the detection window DW, the TDC 250-1 may finely tune the demodulated signal PIN1 based on the reference clock signals PS0 and PS1. The TDC 250-1 may generate the digital signal DS1 by processing the demodulated signal PIN1 based on the reference clock signals PS0 and PS1.

Figure 4:
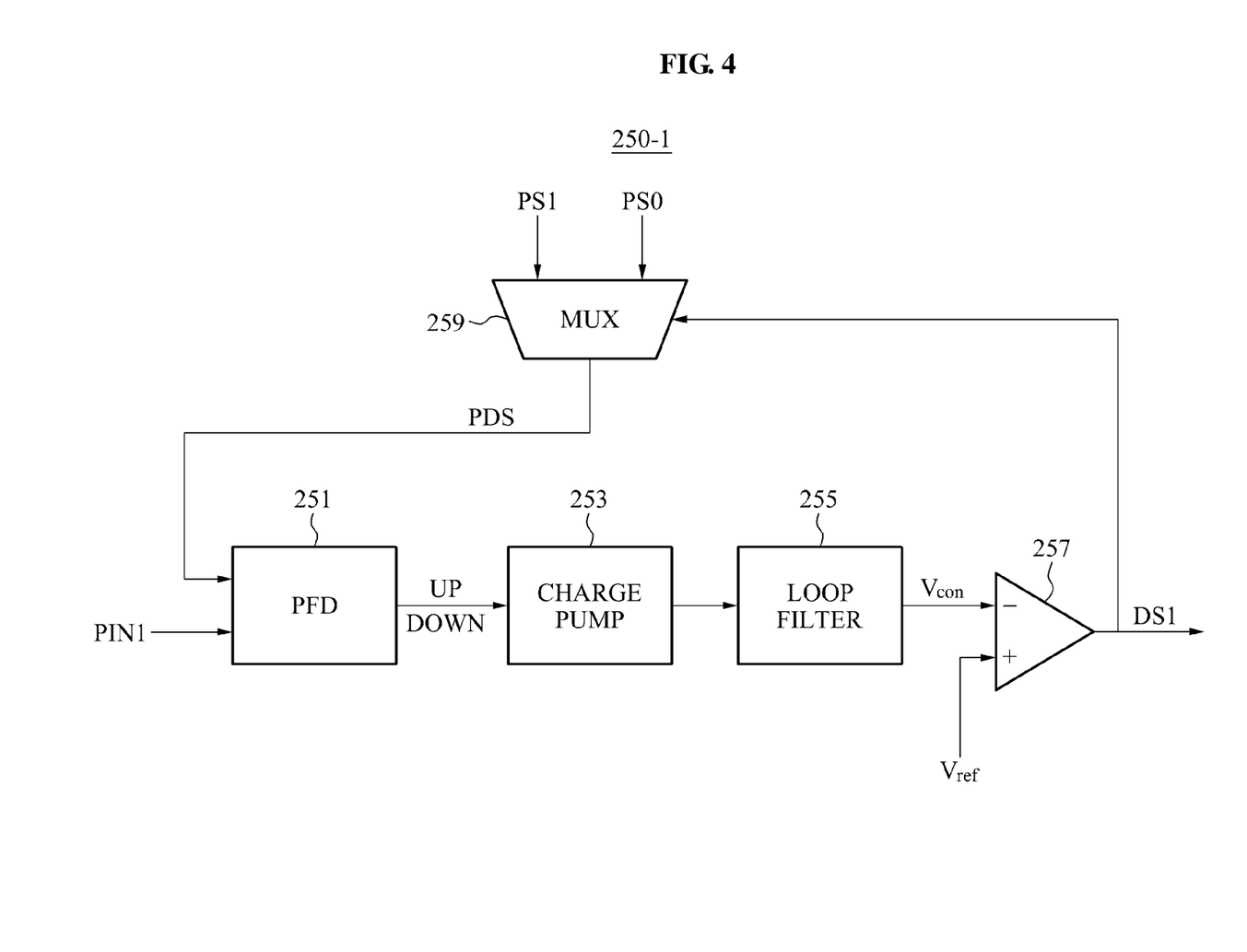
FIG. 4 is a diagram illustrating an example of a time-to-digital converter (TDC) of FIG. 2.

FIG. 4 is a diagram illustrating an example of a structure and an operation of the TDC 250-1 of FIG. 2. For convenience of description, the structure and operation of the TDC 250-1 are described with reference to FIG. 4. Because structures and operations of the TDCs 250-1 to 250-4 are substantially the same, the description of TDC 250-1 of FIG. 4, is also applicable to TDCs 250-2 to 250-4. Thus, the above description may not be repeated for TDCs 250-2 to 250-4.

Referring to FIGS. 1 through 4, the TDC 250-1 includes a phase frequency detector (PFD) 251, a charge pump 253, a loop filter 255, a comparator 257, and a selecting circuit 259.

The PFD 251 may detect a difference between a phase of the demodulated signal PIN1 and a phase of a feedback clock signal PDS, and may generate a first phase detection signal UP or a second phase detection signal DOWN corresponding to the detected difference.

In an example in which the phase of the feedback clock signal PDS lags behind the phase of the demodulated signal PIN1, the PFD 251 may output the first phase detection signal UP. In another example in which the phase of the feedback clock signal PDS leads ahead the phase of the demodulated signal PIN1, the PFD 251 may output the second phase detection signal DOWN. In still another example, in a condition opposite to the above condition, the first phase detection signal UP or the second phase detection signal DOWN may be generated.

In response to the first phase detection signal UP or the second phase detection signal DOWN, the charge pump 253 may source a current output from a power source to an output terminal, or may sink the current from the output terminal to the ground.

In an example in which the first phase detection signal UP is output by the PFD 251, the charge pump 253 may source the output current to the loop filter 255. In another example in which the second phase detection signal DOWN is output by the PFD 251, the charge pump 253 may sink the current from the loop filter 255 to the ground.

The loop filter 255 may generate an output voltage $V_{con}$ that may vary based on sourcing or sinking of the current.

For example, the loop filter 255 may increase the output voltage $V_{con}$ in response to the current being sourced. Additionally, the loop filter 255 may reduce the output voltage $V_{con}$ in response to the current being sunk.

The loop filter 255 may remove a glitch from the current output from the charge pump 253, may prevent a voltage overshoot, and may remove a jitter.

In an example, the charge pump 253 and the loop filter 255 may be implemented as a single circuit. In this example, the circuit may vary the output voltage $V_{con}$ in response to the first phase detection signal UP or the second phase detection signal DOWN.

The comparator 257 may compare the output voltage $V_{con}$ to a reference voltage $V_{ref}$, and may generate the digital signal DS1 based on a result of the comparison. For example, the comparator 257 may compare a level of the output voltage $V_{con}$ to a level of the reference voltage $V_{ref}$, may generate the digital signal DS1 based on a result of the comparison.

In an example in which the PFD 251 outputs the first phase detection signal UP, the comparator 257 may compare an increased level of the output voltage $V_{con}$ to the level of the reference voltage $V_{ref}$, and may generate a digital signal with a first level, for example, logic "0."

In another example in which the PFD 251 outputs the second phase detection signal DOWN, the comparator 257 may compare a decreased level of the output voltage $V_{con}$ to the level of the reference voltage $V_{ref}$, and may generate a digital signal with a second level, for example, logic "1."

The selecting circuit 259 may output one of the reference clock signals PS0 and PS1 as the feedback clock signal PDS, in response to the digital signal DS1. For example, the selecting circuit 259 may output one of the reference clock signals PS0 and PS1 as the feedback clock signal PDS, in response to a level of the digital signal DS1.

In an example, where the digital signal DS1 has a first level, the selecting circuit 259 may output the late reference clock signal PS1 as the feedback clock signal PDS. In another example, where the digital signal DS1 has a second level, the selecting circuit 259 may output the early reference clock signal PS0 as the feedback clock signal PDS. In an example, the selecting circuit 259 may be implemented as a multiplexer (MUX).

Figure 5:
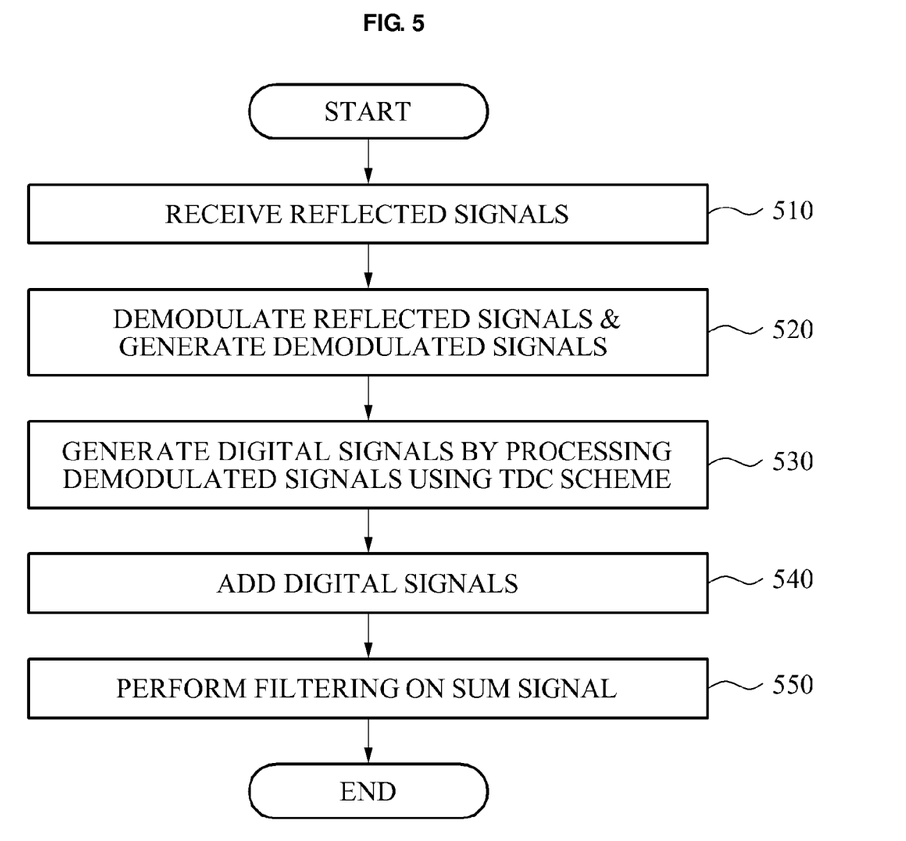
FIG. 5 is a diagram illustrating an example of an operating method of the receiver of FIG. 2.

FIG. 5 is a diagram illustrating an example of an operating method of the receiver 200 of FIG. 2. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. The above descriptions of FIGS. 1-4, is also applicable to FIG. 5, and is incorporated herein by reference. Thus, the above description may not be repeated here.

Referring to FIG. 5, in operation 510, the demodulation circuits 230-1 to 230-4 receive the reflected signals RS1 to RS4 via the antennas 210-1 to 210-4.

In operation 520, the demodulation circuits 230-1 to 230-4 demodulate the reflected signals RS1 to RS4, and generate the demodulated signals PIN1 to PIN4, respectively. For example, the demodulation circuit 230-1 may demodulate the reflected signal RS1, and may generate the demodulated signal PIN1, and the demodulation circuit 230-2 may demodulate the reflected signal RS2, and may generate the demodulated signal PIN2. Additionally, the demodulation circuit 230-3 may demodulate the reflected signal RS3, and may generate the demodulated signal PIN3, and the demodulation circuit 230-4 may demodulate the reflected signal RS4, and may generate the demodulated signal PIN4.

The demodulation circuits 230-1 to 230-4 may transmit the demodulated signals PIN1 to PIN4 to the TDCs 250-1 to 250-4 and to the phase detection circuit 240.

In operation 530, the TDCs 250-1 to 250-4 generate the digital signals DS1 to DS4 by processing the demodulated signals PIN1 to PIN4 based on the reference clock signals PS0 and PS1, using the TDC scheme. As described above, each of the digital signals DS1 to DS4 may include the static delay information and the dynamic delay information. For example, the TDC 250-1 may generate the digital signal DS1 by processing the demodulated signal PIN1, and the TDC 250-2 may generate the digital signal DS2 by processing the demodulated signal PIN2. Additionally, the TDC 250-3 may generate the digital signal DS3 by processing the demodulated signal PIN3, and the TDC 250-4 may generate the digital signal DS4 by processing the demodulated signal PIN4.

In operation 540, the adder 270 adds the digital signals DS1 to DS4.

In operation 550, the filtering circuit 290 performs filtering on the sum signal SS output from the adder 270. For example, the filtering circuit 290 may perform filtering on static delay information included in the sum signal SS. The filtering circuit 290 may perform filtering on the static delay information of each of the digital signals DS1 to DS4, for example, a DC offset.

The processes, functions, and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

As a non-exhaustive illustration only, a terminal or device described herein may refer to mobile devices such as, for example, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths or the like), a personal computer (PC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, or any other device capable of wireless communication or network communication consistent with that disclosed.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A beamforming receiver comprising:
    a demodulation circuit configured to receive a signal reflected from an object via an antenna, to demodulate the received signal, and to generate a demodulated signal;
    a phase detection circuit configured to detect a change in a phase of the demodulated signal based on a defection window defined by reference dock signals; and
    a time delay circuit configured to tune the demodulated signal based on the change in a phase and to generate a digital signal by processing the demodulated signal based on the reference clock signals,
    wherein the digital signal comprises static delay information associated with a static motion of the object and dynamic delay information associated with a dynamic motion of the object, and the static delay information and the dynamic delay information comprises information on a delay of a reflected signal caused by the object.

2. The receiver of claim 1, wherein the static delay information comprises a direct current (DC) offset, and the dynamic delay information comprises an alternating current (AC) component.

3. The receiver of claim 1, further comprising a filtering circuit configured to filter the static delay information in the digital signal.

4. The receiver of claim 3, further comprising an adder configured to add a plurality of digital signals.

5. The receiver of claim 4, wherein the adder is connected to a rear side of the filtering circuit.

6. The receiver of claim 4, wherein the adder is disposed between the time delay circuit and the filtering circuit.

7. The receiver of claim 4, wherein the adder is further configured:
    to generate a sum signal based on adding the static delay information and the dynamic delay information of the plurality of digital signals; and
    to provide the added sum signal to the filtering circuit.

8. The receiver of claim 3, wherein the filtering circuit is implemented as at least one of a high-pass filter (HPF) or a band-pass filter (BPF).

9. The receiver of claim 1, wherein the demodulation circuit comprises:
    a low-noise amplifier (LNA) configured to amplify the reflected signal to generate an amplified signal; and
    a demodulator configured to demodulate the amplified signal to generate the demodulated signal.

10. The receiver of claim 9, wherein the LNA is further configured to remove noise from the reflected signal.

11. The receiver of claim 1, wherein in response to the change being detected within the detection window, the time delay circuit is further configured to generate the digital signal by processing the demodulated signal based on the reference clock signals.

12. The receiver of claim 1, wherein the time delay circuit comprises a 1-bit delta-sigma time delay circuit.

13. A method of operating a beamforming receiver, the method comprising:
    receiving a signal reflected from an object via an antenna;
    demodulating the received signal to generate a demodulated signal;
    tuning the demodulated signal based on the change in a phase;
    generating a digital signal by processing the demodulated signal based on the reference clock signals,
    wherein the digital signal comprises static delay information associated with a static motion of the object and dynamic delay information associated with a dynamic motion of the object, and the static delay information and the dynamic delay information comprises information on a delay of a reflected signal caused by the object.

14. The method of claim 13, wherein the digital signal is generated using a time-to-digital conversion (TDC) scheme.

15. The operating method of claim 13, wherein the static delay information comprises a direct current (DC) offset, and the dynamic delay information comprises an alternating current (AC) component.

16. The operating method of claim 13, further comprising adding a plurality of the digital signals.

17. The operating method of claim 13, further comprising filtering the static delay information in the digital signal.

18. The operating method of claim 13, wherein the demodulating comprises:
   amplifying the reflected signal to generate an amplified signal; and
   demodulating the amplified signal to generate the demodulated signal.

19. The operating method of claim 13, wherein the generating comprises:
   generating the digital signals by processing the demodulated signal based on the reference clock signals in response to the change being detected within the detection window.

* * * * *

UNITED STATES PATENT AND TRADEMARK OFFICE
CERTIFICATE OF CORRECTION

PATENT NO. : 9,791,561 B2  
APPLICATION NO. : 14/339669  
DATED : October 17, 2017  
INVENTOR(S) : Woogeun Rhee et al.

Page 1 of 1

It is certified that error appears in the above-identified patent and that said Letters Patent is hereby corrected as shown below:

On the Title Page (73) Assignee should read: Samsung Electronics Co., Ltd., Suwon-si, (KR);
Tsinghua University, Beijing, (CN)

Signed and Sealed this
Eighth Day of May, 2018

Andrei Iancu
*Director of the United States Patent and Trademark Office*